(12) United States Patent
Guerin

(10) Patent No.: US 10,250,387 B1
(45) Date of Patent: Apr. 2, 2019

(54) QUANTUM COMPUTER RESISTANT ALGORITHM CRYPTOGRAPHIC KEY GENERATION, STORAGE, AND TRANSFER DEVICE

(71) Applicant: Patrick Joseph Guerin, Colorado Springs, CO (US)

(72) Inventor: Patrick Joseph Guerin, Colorado Springs, CO (US)

(*) Notice: Subject to any disclaimer, the term of this patent is extended or adjusted under 35 U.S.C. 154(b) by 54 days.

(21) Appl. No.: 15/599,323

(22) Filed: May 18, 2017

Related U.S. Application Data

(60) Provisional application No. 62/338,427, filed on May 18, 2016.

(51) Int. Cl.
*H04L 9/08* (2006.01)

(52) U.S. Cl.
CPC .......... *H04L 9/0869* (2013.01); *H04L 9/0819* (2013.01); *H04L 2209/80* (2013.01)

(58) Field of Classification Search
USPC .......................................................... 380/44
See application file for complete search history.

(56) References Cited

U.S. PATENT DOCUMENTS

2015/0055778 A1* 2/2015 Cox .................. H04L 9/0662
                                                         380/46
2016/0291936 A1* 10/2016 Margetts ................ G06F 7/588

OTHER PUBLICATIONS

"NIAP, Protection Profile for Mobile Device Fundamentals, Oct. 21, 2013, Version 1.0".*

* cited by examiner

*Primary Examiner* — Kambiz Zand
*Assistant Examiner* — Thanh H Le
(74) *Attorney, Agent, or Firm* — Plager Schack LLP; Mark H. Plager; Alexis J. Saenz

(57) ABSTRACT

A system and process provides quantum computer resistant algorithm cryptographic keys. Embodiments utilize a hardware noise source whose entropy is fed to a random bit generator to generate keys which go straight to the advanced encryption standard. The keys avoid the need for mutual authentication and are thus not subject to reverse factoring that can be accomplished through quantum computing.

10 Claims, 4 Drawing Sheets

US 10,250,387 B1

QUANTUM COMPUTER RESISTANT ALGORITHM CRYPTOGRAPHIC KEY GENERATION, STORAGE, AND TRANSFER DEVICE

CROSS REFERENCE TO RELATED APPLICATIONS

This application claims benefit under 35 U.S.C. § 119(e) of U.S. Provisional Application having Ser. No. 62/338,427 filed May 18, 2016, which is hereby incorporated by reference herein in its entirety.

BACKGROUND

The embodiments herein relate generally to security systems.

NSA's Commercial Solutions for Classified (CSfC) program permits commercial cryptography products to be used for protecting US National Security Systems (NSS). Originally, CSfC mandated the use of Suite B cryptography—specifically, the use of Elliptic Curve Digital Signature Algorithm (ECDSA) for the purpose of authenticating cryptographic peers to each other, and Elliptic Curve Diffie-Hellman (ECDH) for key exchange.

In late 2015, NSA raised concerns about the threat that quantum computing represents to cryptography which depends on the difficulty of the discrete logarithm problem—ECDSA and ECDH fall into this category. Because some classified information has a very long lifetime in which it must remain classified, the development of a practical quantum computer even twenty years from now still represents a threat, as an adversary could capture and store encrypted data and then use a quantum computer in the future to decrypt it. To counter this risk, NSA began accepting the use of Pre-Shared Keys (PSKs) as an alternative, or in addition to the EC-based (and all other quantum computer vulnerable) key-related ciphers. Provided minimum entropy is provided, PSKs are not threatened by development of a quantum computer.

Government cryptographic systems have depended on PSKs for decades. From the beginning, the most significant problem with PSKs was that they were difficult (a) to securely distribute, and (b) generate with sufficient cryptographic entropy to ensure they had the strength required to protect the information. In the past, to solve these problems, NSA developed and approved specialized equipment—collectively known as "Type 1" products. Type 1 products are typically classified, requiring stringent and sometimes operationally limiting Controlled Cryptographic Item (CCI) handling and Operational Security (OPSEC) procedures. Type 1 products are also export controlled under International Traffic in Arms Regulations (ITAR). Further, Type 1 products are only permitted to connect to other Type 1 products—it would not be possible to use a Type 1 key loader with a commercial product to be used in CSfC.

The NIAP has published a Common Criteria document entitled "Protection Profile for Mobile Device Fundamentals" (MDF-PP). Devices which comply with the MDF-PP and have been evaluated by an independent testing laboratory are listed on the NIAP Product Compliant List. The US Department of Defense (DoD) published the DoD Annex to the MDF-PP which cites additional MDF-specific configuration controls. Devices compliant with both the MDF PP and the DoD MDF PP controls (both hereafter referred to collectively as "MDF devices") provide baseline security capabilities appropriate for protecting classified information, when used in an overall NSA CSfC architecture.

As can be seen, there is a need for a system and process that provides quantum computer resistant algorithm cryptographic keys under the above described standards.

SUMMARY

In one aspect of the invention, a computer program product for generating a quantum computer resistant algorithm cryptographic key on a computing device comprises a non-transitory computer readable storage medium having computer readable program code embodied therewith. The computer readable program code is configured to: identify a hardware noise source on the computing device; collect entropy, by a kernel layer of the computing device's operating system, from the hardware noise source; provide the entropy to a Deterministic Random Bit Generator (DRBG) in a crypto API installed on the computing device; and generate a cryptographic key from output provided by the DRBG.

In another aspect, a process for generating a quantum computer resistant algorithm cryptographic key on a computing device comprises identifying a hardware noise source on the computing device; collecting entropy, by a kernel layer of the computing device's operating system, from the hardware noise source; providing the entropy to a deterministic Random Bit Generator (DRBG) in a crypto API installed on the computing device; and generating a cryptographic key from output provided by the DRBG

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed invention provide a quantum computer resistant algorithm cryptographic key generation process and cryptographic key storage and transfer device (referred to herein generally as the "system"). In an exemplary embodiment, the system is a combination of a Data Transfer Device (DTD) (for example, a CYZ-10 and a fill device), but one that may deviate significantly from those designed to support Type 1 systems. The system incorporates a key generation function, which in Type 1 systems is a function typically provided by internal systems at the National Security Agency (NSA). As is known in the field, key generation is not a normal function of a fill device. The system communicates with commercial devices through a serial/USB port (unlike traditional fill devices which use specialized connectors that are proprietary to government encryption devices). The system does not require formal NSA approval as a traditional fill device is required to have. In fact, there is currently no NSA concept of a fill device for CSfC and so no approval program. The system may be purpose built and provides a specific subset of the services provided to Type 1 devices, but in an unclassified and non-ITAR form appropriate for CSfC. Aspects of the subject technology ensure that quantum computer resistant algorithm cryptographic keys are generated safely, securely, and with sufficient strength for manual configuration onto CSfC-compliant devices.

For example, the system's base platform may be a MDF-PP certified (MDF) device and operating system. As will be described below with respect to operation of the subject technology, several services and/or "Security Objectives" provided by "standard" MDF-PP certified devices must be disabled or removed in order for the system to operate. In this way, many of the baseline security features required by the system can be provided by any number of (modified, MDF-PP certified) devices rather than building those into the system custom software application.

Figure 1:
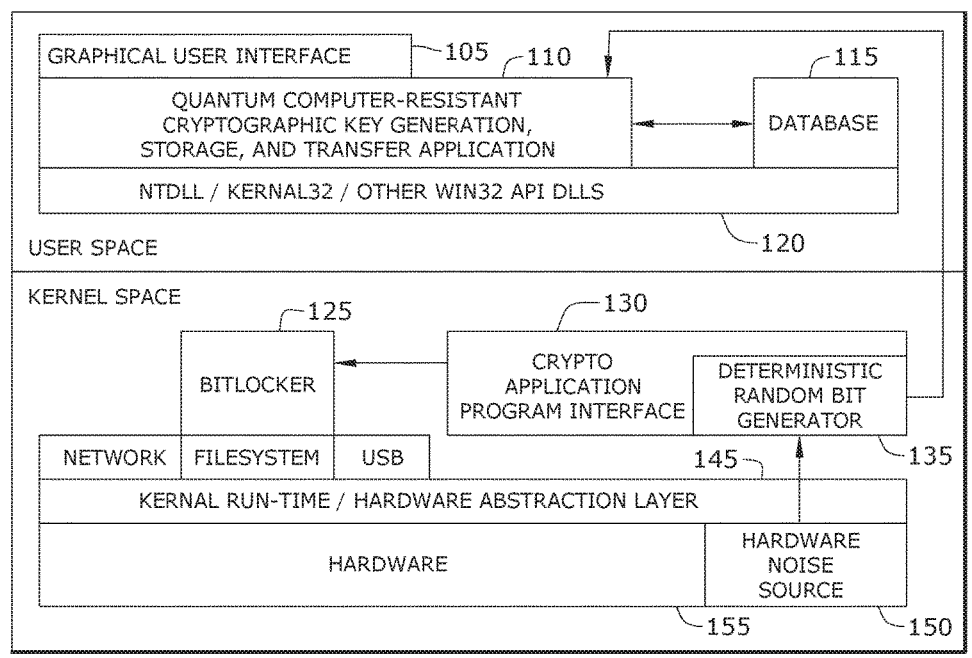
FIG. 1 is a block diagram of a computing system's architecture for a quantum computer resistant algorithm cryptographic key generator according to an embodiment of the subject technology.

Referring now to FIG. 1, a computing system 10 is shown using architecture which shows identification of, and flows between key system and system-supporting components. In one aspect, the system is a portable cryptographic key generator and key loader for commercial products used in either commercial or classified information systems. Embodiments generate, store, and transfer quantum computer resistant algorithm cryptographic keys for and to devices that are deployed as part of the NSA CSfC program. The system comprises a software application 110 (referred to generally as the "application 110") running on commercially available, National Information Assurance Partnership (NIAP) Mobile Device Framework-modified mobile devices (for example, computing device 10). In an exemplary embodiment, the application 110 (accessible via GUI 105) runs in the computing system 10's kernel space, identifying a hardware noise source 150 from one or more pieces of hardware 155 on the computing device 10. A kernel runtime/hardware abstraction layer 145 collects entropy from the hardware noise source 150. The entropy may be provided to a deterministic Random Bit Generator (DRBG) 135 in a crypto API 130 installed on the computing device 10. The crypto API 130 may generate a cryptographic key from output provided by the DRBG 135 using the collected entropy. Generated keys may be stored in database 115. The stored generated keys may be protected in the database 115 by an encryption system 125 (for example, Bitlocker)

Figure 2:
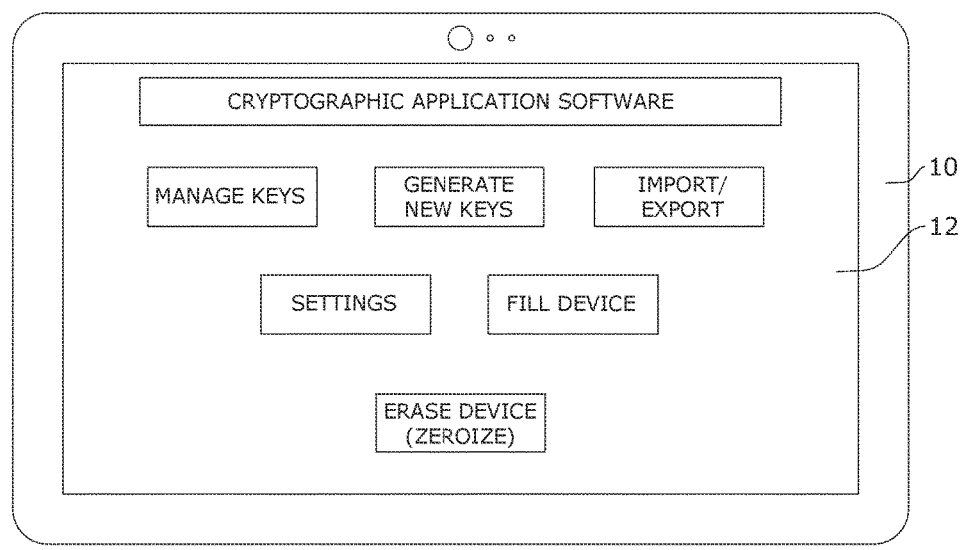
FIG. 2 is a screenshot of a graphical user interface main menu for the system of FIG. 2 according to an embodiment of the subject technology.
Figure 3:
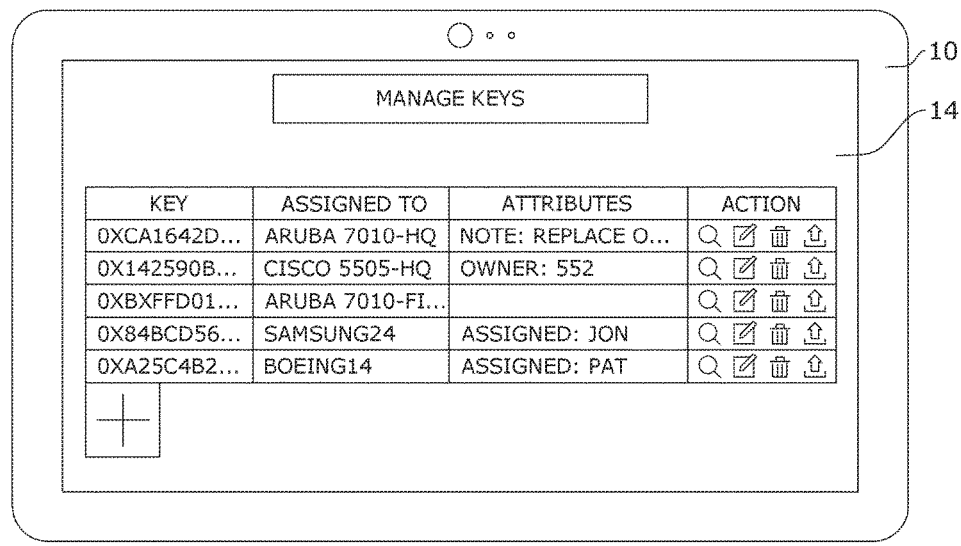
FIG. 3 is a screenshot of a graphical user interface key management screen for the system of FIG. 2 according to an embodiment of the subject technology.

FIGS. 2 and 3 show examples of GUIs 12 and 14 which provide controls suitable for use with a touch-screen device, to generate and manage keys. The device elements shown in FIGS. 1-3 may be described more fully or as elements of a general computing device 10 with respect to FIG. 6 discussed below. The block labeled "Kickstand" may refer to a product name for the application 110 (FIG. 1). The block labeled "Manage Keys" may trigger upon selection, another GUI 14 (FIG. 3) which allows the user to perform various actions on cryptographic keys generated by the application 110 (FIG. 1). Similarly, the remaining blocks are labeled with their respective GUI interface screens that will allow the user to perform actions related to the cryptographic key generation process(es) described herein, that for sake of illustration are omitted, however examples of user actions are described below with respect to FIG. 5.

Figure 4:
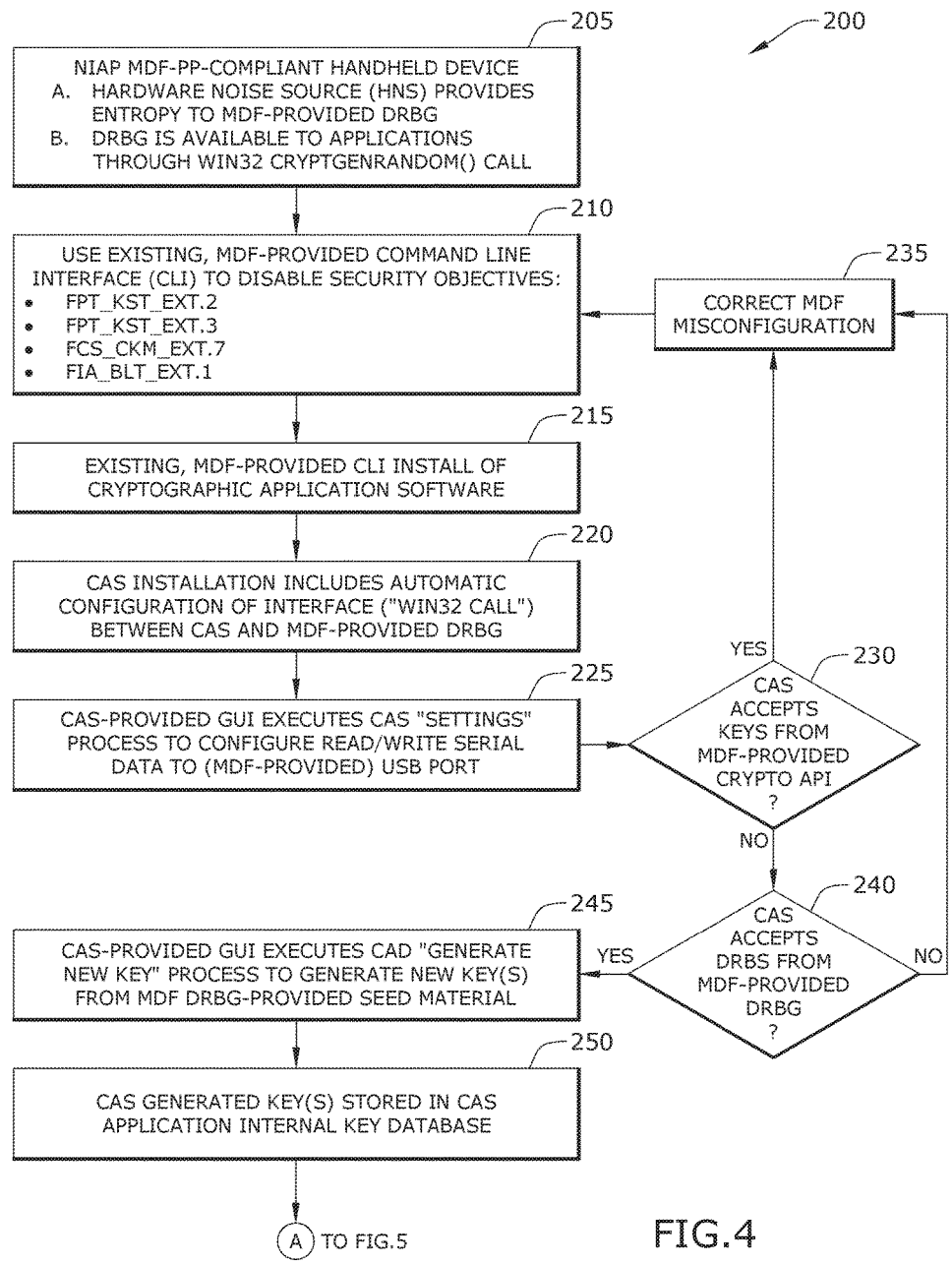
FIGS. 4 and 5 are a flowchart of a process for deploying cryptographic key generation under the system architecture of FIG. 1 according to an embodiment of the subject technology.
Figure 5:
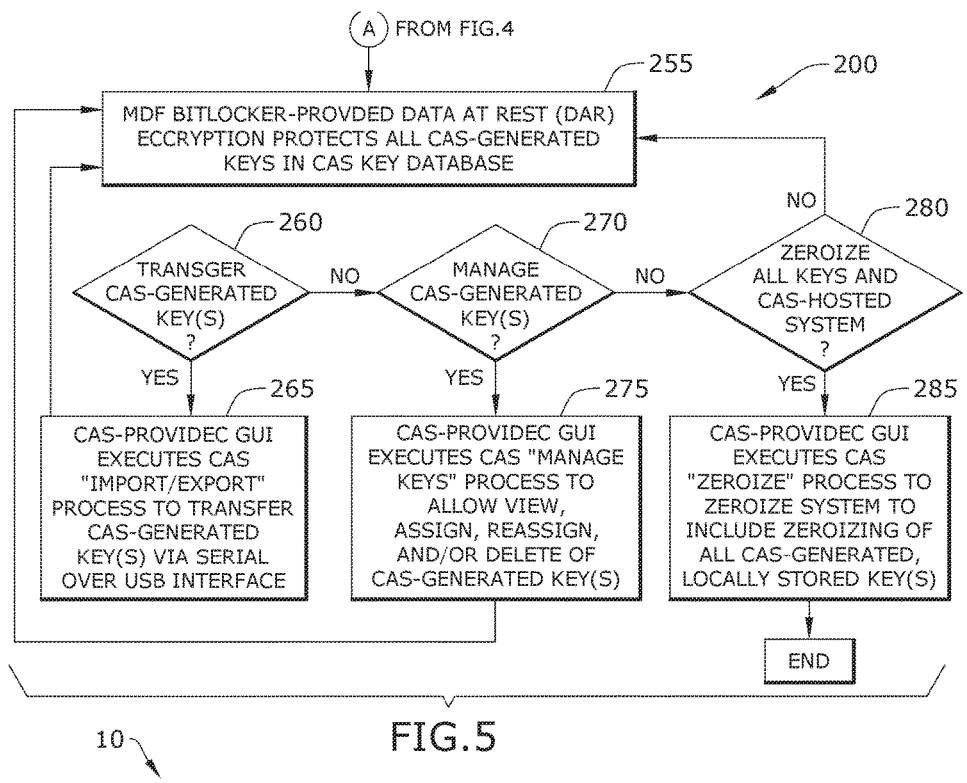

Referring now to FIGS. 4 and 5 (with concurrent reference back to the architecture of FIG. 1), a flowchart 200 illustrates how the system is built and employed according to an exemplary operation. The system's base platform can be any MDF-PP certified device and operating system. As will be understood, while FIG. 1 depicts the system application software (CAS) (for example, application 110) running on a Microsoft Windows-based MDF and communicating with a Windows-hosted DRBG via a Win32 API, the CAS can run on, and interface with the MDF-provided DRBG on any MDF-compliant Android, Apple and/or Linux platform. The device and operating systems are integral to the system and the CAS software may not be separable from the underlying platform. Although the CAS may run on a general-purpose Windows (or other OS running) computer, it may not provide the same security assurance that it provides when running on the MDF-PP compliant platform as modified to support the system. The MDF device's Hardware Noise Source (HNS) provides entropy that is collected 205 by the kernel and fed to the MDF-provided Deterministic Random Bit Generator (DRBG). From that point, this entropy is available to applications through the Win32 CryptGenRandom( ) call. The system uses this call to provide seed material for key generation.

The MDF-PP certified device may initially be configured so that it operates according to the MDF-PP evaluated configuration. This is done by following the platform-specific, MDF-PP NIAP guidance. Prior to installing the system CAS, the following MDF-PP 'standard' services and/or 'Security Objectives' should be disabled or removed 210 from the MDF-PP certified device using the MDF-provided Command Line Interface (CLI):

FPT_KST_EXT.2 Extended: No Key Transmission
FPT_KST_EXT.3 Extended: No Plaintext Key Export
FCS_CKM_EXT.7 Extended: Bluetooth Key Generation
FIA_BLT_EXT.1 Extended: Bluetooth User Authorization CAS is installed 215 using the existing, MDF-provided CLI. Note that this installation also includes an option for the CAS installer to also install one of several, MDF-platform-specific Open standard data stores/Databases (DBs). Alternatively, the CAS can connect to a pre-existing MDF-provided data store/DB. Connectivity between the actual CAS application and the 'external to CAS' data store/DB is through an Open Database Connectivity-compliant (ODBC-compliant) connection that is also established as part of the overall CAS application installation.

The MDF device operating system may provide the programming interface (Win32 API as depicted in this example) that interfaces with all hardware components, including network, USB, and disk storage. By default, the CAS installation configures 220 the ('Win32 call') communications between the CAS and the MDF-provided DRBG to assure ONLY DRBs (and not quantum computer vulnerable algorithm-supporting certificates or keys) are sent.

The CAS-provided GUI executes 225 CAS 'Settings' process to configure read/write serial data to (MDF-provided) USB port. A determination 230 may be performed as to whether the CAS accepts the keys from the MDF-provided crypto-API. If a misconfiguration is detected, a CAS error message appears indicating 235 an MDF Crypto configuration error has been detected that requires an operator to check/reconfigure Security Objective disabling. If detected, CAS error message appears 235 indicating an MDF DRB configuration error has been detected that requires operator to check/reconfigure Security Objective disabling. Otherwise, the CAS accepts 240 only DRBS from MDF-provided DRBG. As a result, the CAS-provided GUI executes 245 a CAS "Generate New Key" process to generate new key(s).

The CAS-generated key(s), along with information related to the keys (such as the device to which a particular key is assigned) are stored 250 in the CAS-connected, external key database. Any ODBC-compliant database will suffice. It should be noted that minimal ODBC-compliant DBs should suffice and that, based on the system Concept of Operations (CONOPS) an enterprise-style SQL database is NOT a minimum requirement.

The MDF device Operating System may further provide 255 encrypted disk storage (Data at Rest) in the form of Bitlocker. If the operator needs to transfer 260 a key or keys, the CAS-provided GUI executes 265 the CAS 'Import/Export' process to transfer CAS-generated key(s) via (MDF-provided) serial over USB interface. For interaction with external devices, the MDF standard USB-to-RS232 adapter may be employed. This is an external device and requires Windows device drivers. The external device will present itself to the MDF device Operating System as a COM port, which the system will control. If the operator needs to manage 270 a key or keys, the CAS-provided GUI executes 275 the CAS 'Manage Keys' process to allow view, assign, re-assign, and/or delete of CAS-generated key(s). If operator needs to zeroize 280 all keys and the CAS-hosted system, the CAS-provided GUI (17) executes 285 the CAS "Zeroize" process to zeroize the MDF device to include Zeroizing of all CAS-generated, locally stored keys.

As will be appreciated, the subject technology is the first product designed that generates, stores, and transfers appropriate strength (entropy) quantum computer algorithm-resistant cryptographic keys in one device. Instead of using the (quantum computer-vulnerable) cryptographic algorithms and key generation services currently provided by NIAP MDF devices, aspects disclosed herein disable those MDF services and generate quantum computer resistant algorithm keys using the raw, MDF-provided provided Deterministic Random Bits Generator.

Current NSA CSfC key generation and/or distribution is certificate based, employs (quantum computer vulnerable) EC ciphers, and relies on a number of separate products and services. The embodiments of the subject technology disclosed herein are not certificate or EC-based, and use a single device that generates, stores, and transfers quantum computer resistant cryptographic algorithm PSKs. The system cost and Operational Security (OPSEC) controls are greatly reduced because the system employs a layered, commercial standards-based architecture vice employing any Type-1 encryption/Controlled Cryptographic Item-based (CCI-based) components.

As will be appreciated, aspects of the embodiments described above provide a combination key generation, storage and transfer device that generates entropy (randomness) within the local device that is also used locally by the key generation process. Key generation is accomplished via a single device by a single person. Using a single device satisfies an interest from the NSA Commercial Solution for Classified (CSfC) Program Office. Device keys may be generated during a handshake over optical fiber between QKD nodes or networks. Device-based generation is significant and not obvious because QKD systems are not portable/tactical which tend to be configured for optical based networks and multi-node systems. In addition, aspects support quantum resistant (non-asymmetric) crypto algorithms with the effectiveness of QKD systems but the keys are generated differently as described above. Embodiments create/store/transfer what essentially appears to be a 'symmetric' cryptographic key. External encryption/decryption devices that use aspects of the subject technology may employ encryption/decryption that is resistant to quantum computer attacks (for example, anything that uses Shor's algorithm).

Figure 6:
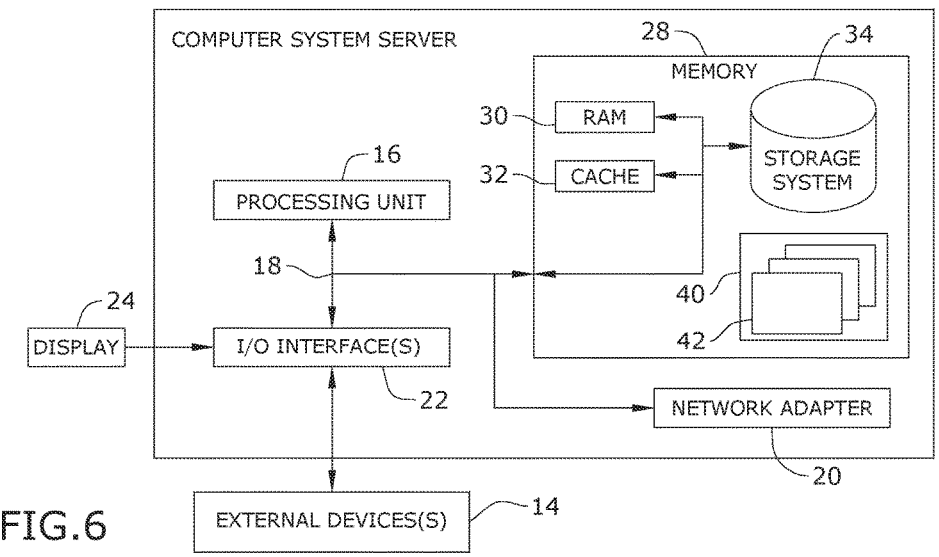
FIG. 6 is a block diagram of a computing system according to an embodiment of the subject technology.

Referring now to FIG. 6, a schematic of an example of an MDF-compliant computer system/server 10 is shown. The computer system/server 10 is shown in the form of a general-purpose computing device. The computer system/server 10 may serve the role as the machine in FIG. 1 implementing for example the functions described above in FIGS. 4 and 5. The components of the computer system/server 10 may include, but are not limited to, one or more processors or processing units 16, a system memory 28, and a bus 18 that couples various system components including the system memory 28 to the processor 16. The computer system/server 10 may be for example, personal computer systems, tablet devices, mobile telephone devices, handheld or laptop devices, multiprocessor systems, microprocessor-based systems, and programmable consumer electronics. The computer system/server 10 may be described in the general context of computer system executable instructions, such as program modules, being executed by a computer system (described for example, below).

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention (for example, those performed by CAS 110. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments described above including for example configuration processes, key generation, key storage, and key management.

The computer system/server 10 may also communicate with a display 24 (conventional or touch sensitive) and one or more external devices 14 such as a keyboard, a pointing device, optical fiber ports, or internally run applications accessible by the display 24 such as a graphical user interface, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 may communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for generating a quantum computer resistant algorithm cryptographic key on a computing device, the computer program product comprising a non-transitory computer readable storage medium having computer readable program code embodied therewith, the computer readable program code being configured to:

identify, from a kernel space running in an operating system of the computing device, a hardware noise source in the computing device;

collect entropy, by a kernel run-time/hardware abstraction layer of the computing device's operating system, from the hardware noise source;

provide the entropy to a deterministic Random Bit Generator (DRBG) in a crypto API installed on the computing device; and generate a cryptographic key from output provided by the DRBG.

2. The computer program product of claim 1, wherein the computing device is a Protection Profile for Mobile Device Fundamentals (MDF-PP) compliant machine.

3. The computer program product of claim 1, further comprising computer readable program code configured to disable Mobile Device Fundamentals (MDF) security objective services prior to collecting entropy.

4. The computer program product of claim 1, further comprising computer readable program code configured to encrypt, within the computing device, the generated cryptographic key using an encryption system resident in the kernel run-time/hardware abstraction layer.

5. The computer program product of claim 1, further comprising computer readable program code configured to transfer the generated cryptographic key to an external device through a communications port and manage the transferred generated cryptographic key via a user interface accessed through the computing device.

6. A process for generating a quantum computer resistant algorithm cryptographic key on a computing device, comprising:

identifying, from a kernel space running in an operating system of the computing device, a hardware noise source in the computing device;

collecting entropy, by a kernel run-time/hardware abstraction layer of the computing device's operating system, from the hardware noise source;

providing the entropy to a deterministic Random Bit Generator (DRBG) in a crypto API installed on the computing device; and generating a cryptographic key from output provided by the DRBG.

7. The process of claim 6, wherein the computing device is a Protection Profile for Mobile Device Fundamentals (MDF-PP) compliant machine.

8. The process of claim 6, further comprising disabling Mobile Device Fundamentals (MDF) security objective services prior to collecting entropy.

9. The process of claim 6, further comprising encrypting, within the computing device, the generated cryptographic key using an encryption system resident in the kernel run-time/hardware abstraction layer.

10. The process of claim 6, further comprising transferring the generated cryptographic key to an external device through a communications port and managing the transferred generated cryptographic key via a user interface accessed through the computing device.

* * * * *